(12) United States Patent
Kraeuter et al.

(10) Patent No.: US 8,196,789 B2
(45) Date of Patent: Jun. 12, 2012

(54) SKEWER ASSEMBLY FOR BICYCLE FORK MOUNT

(75) Inventors: Charles Kraeuter, Portland, OR (US); Chris Sautter, Portland, OR (US)

(73) Assignee: Yakima Products, Inc., Beaverton, OR (US)

( * ) Notice: Subject to any disclaimer, the term of this patent is extended or adjusted under 35 U.S.C. 154(b) by 223 days.

(21) Appl. No.: 12/813,477

(22) Filed: Jun. 10, 2010

(65) Prior Publication Data

US 2011/0139840 A1 Jun. 16, 2011

Related U.S. Application Data

(60) Provisional application No. 61/186,685, filed on Jun. 12, 2009.

(51) Int. Cl.
*B60R 9/048* (2006.01)
(52) U.S. Cl. .......... 224/315; 224/324; 224/924
(58) Field of Classification Search .......... 224/315, 224/324, 924; 403/320; 301/110.5
See application file for complete search history.

(56) References Cited

U.S. PATENT DOCUMENTS

| 3,578,363 | A | 5/1971 | Derocker |
| 4,219,286 | A | 8/1980 | Lindenthal |
| 5,511,894 | A | 4/1996 | Ng |
| 6,322,279 | B1 | 11/2001 | Yamamoto |
| 6,758,380 | B1 * | 7/2004 | Kolda ............ 224/315 |
| 6,938,782 | B2 * | 9/2005 | Dean et al. ............ 211/20 |
| 7,237,704 | B2 * | 7/2007 | Dean ............ 224/324 |
| 7,726,529 | B2 * | 6/2010 | Foley ............ 224/324 |
| 2005/0173356 | A1 | 8/2005 | Vodicka |

OTHER PUBLICATIONS

The International Bureau of WIPO,"International Search Report and Written Opinion of the International Searching Authority" regarding PCT Application No. PCT/US201038233, dated Sep. 4, 2010, 2 pages.

* cited by examiner

*Primary Examiner* — Justin Larson
(74) *Attorney, Agent, or Firm* — Kolisch Hartwell, P.C.

(57) ABSTRACT

A bike rack for carrying a bicycle on a vehicle includes an elongate body for supporting a bicycle, and a fork mount for securing the front fork of the bicycle. A fork mount includes a skewer assembly having a shaft and a keyed member being freed to slide axially along the shaft, but not permitted to rotate around the shaft. A handle device is provided for rotation around the shaft causing adjustment of the effective length of the shaft. A lock device is configured to couple the handle device to the keyed member and prevent rotation of the handle around the shaft.

19 Claims, 5 Drawing Sheets

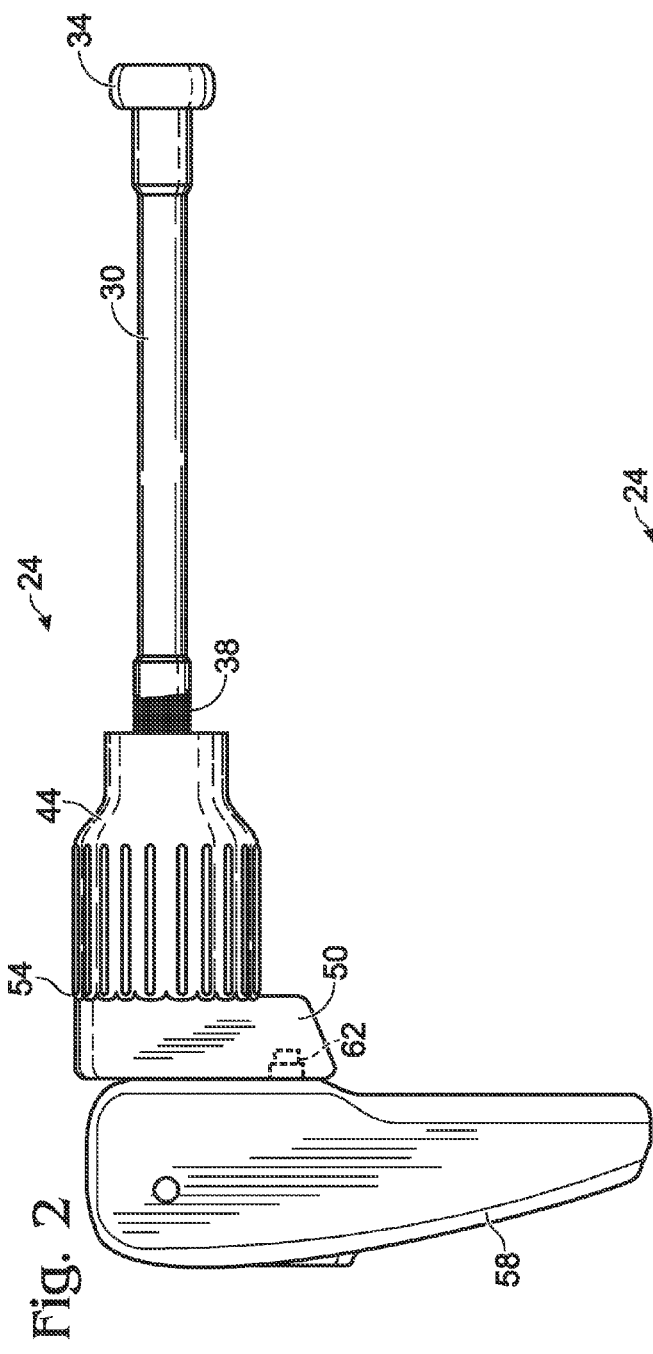
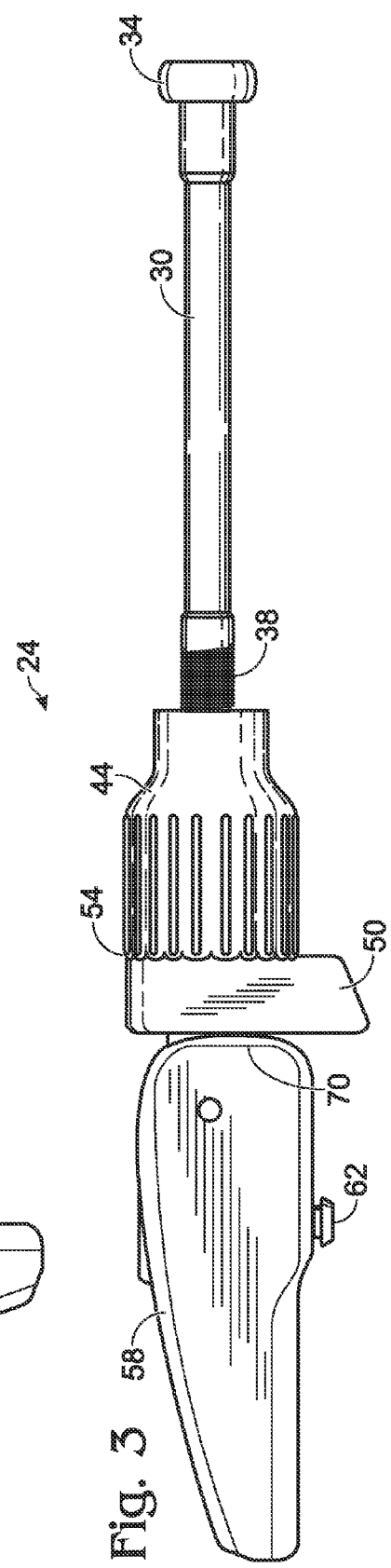

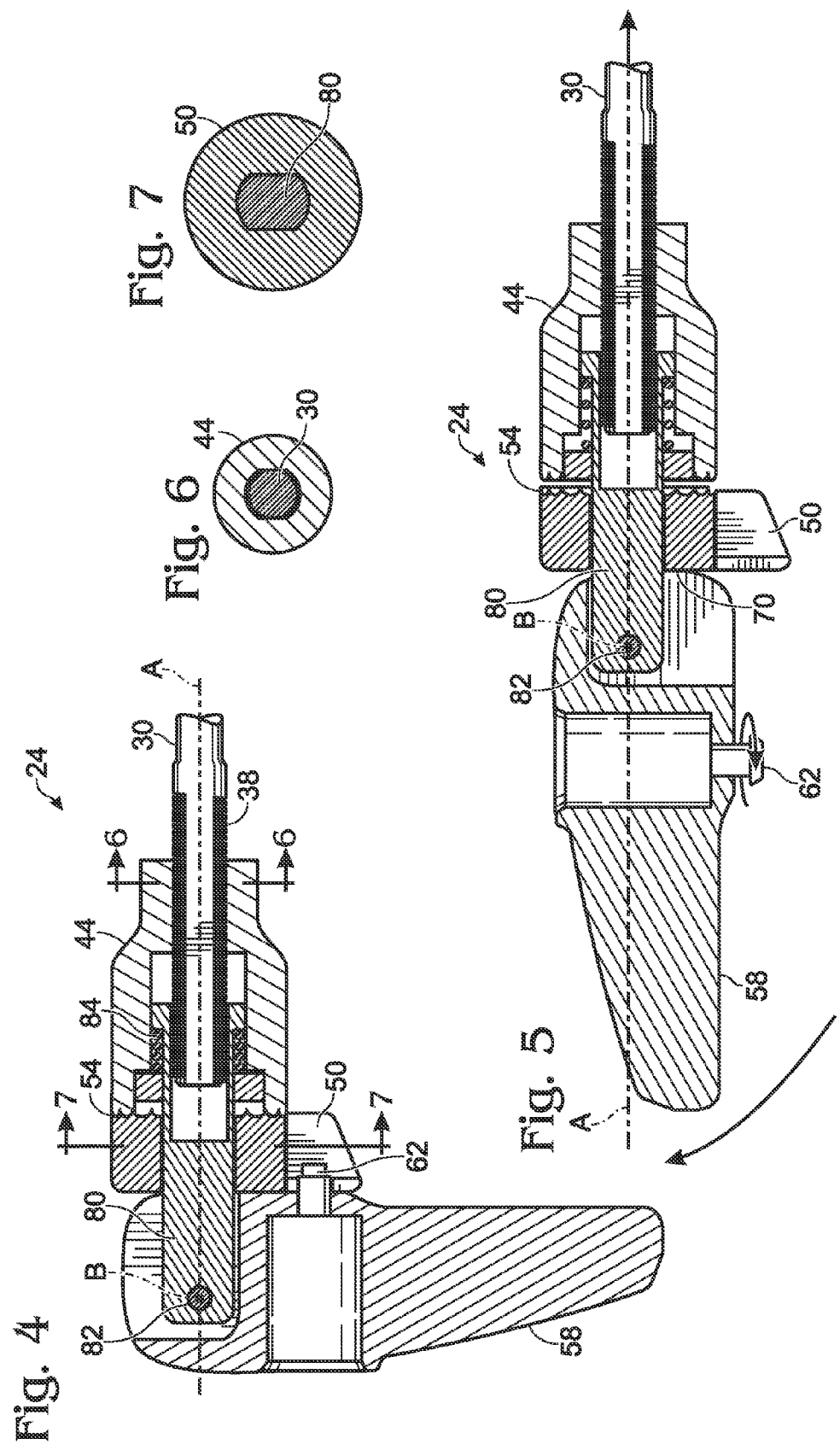

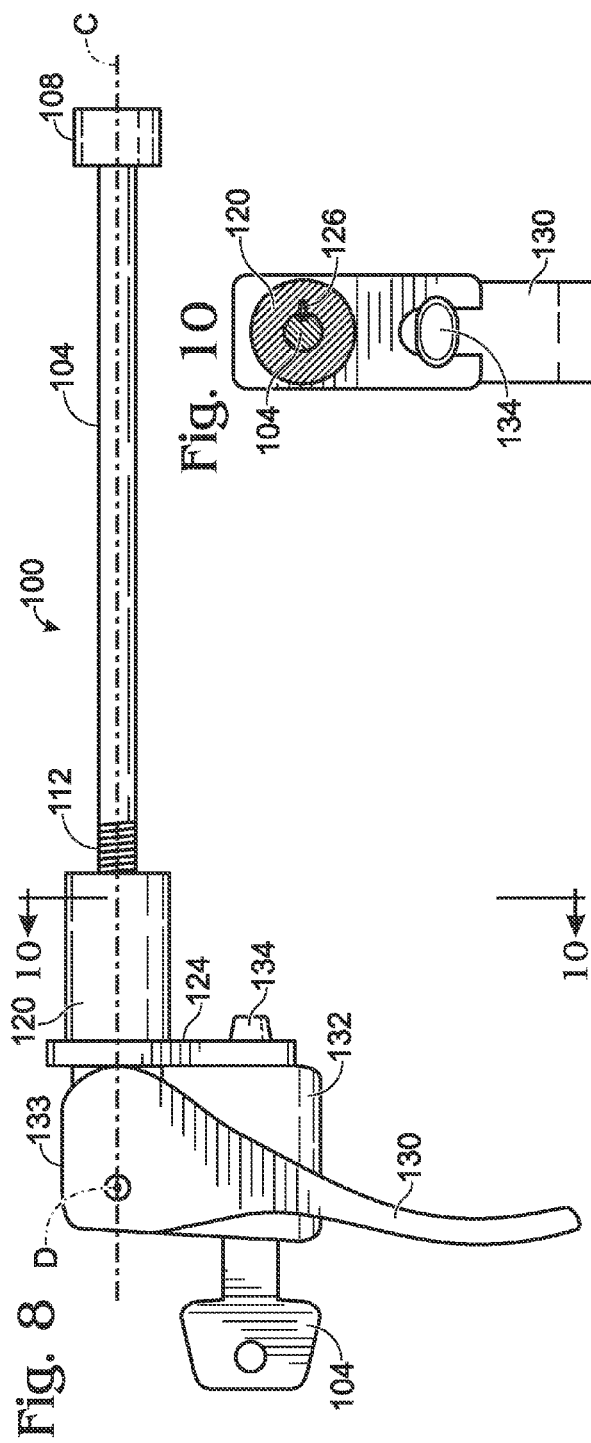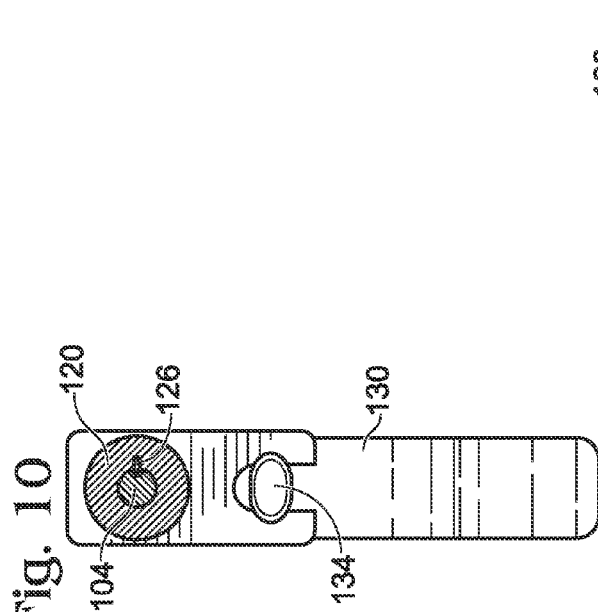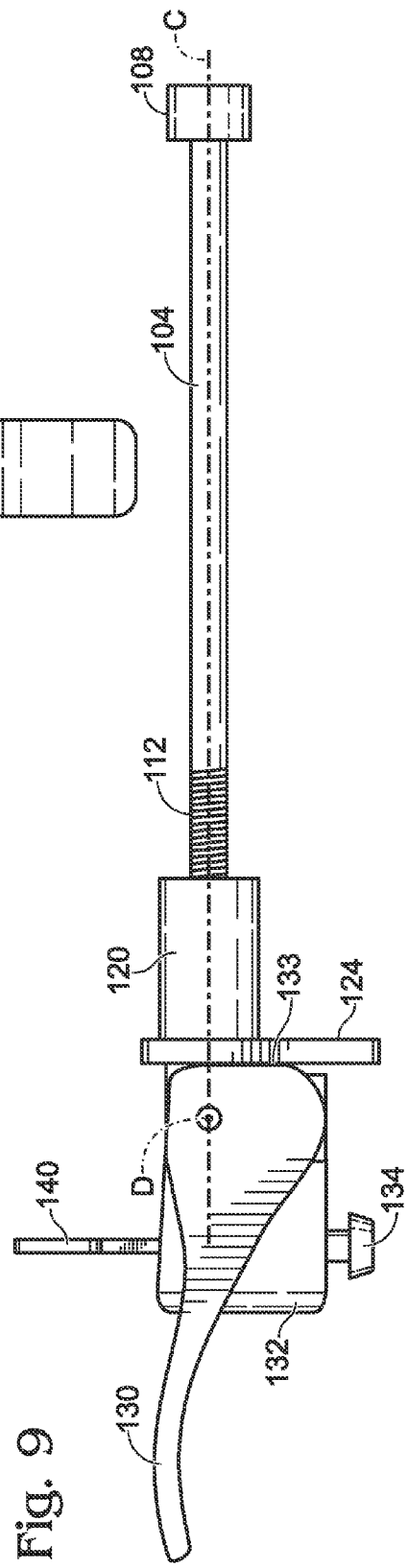

SKEWER ASSEMBLY FOR BICYCLE FORK MOUNT

CROSS-REFERENCE TO RELATED APPLICATION

This application claims priority from U.S. Provisional Patent Application Ser. No. 61/186,685, filed Jun. 12, 2009 which is incorporated herein by reference. This application incorporates by reference in their entireties the following: U.S. Pat. Nos. 6,460,708, 6,494,351, and U.S. Publication No. US2007/0119887 A1.

BACKGROUND

Many types of racks are useful for carrying cargo on vehicles. For example, vehicle racks may be used to carry bikes, boats, skis, snowboards, surfboards, bags, boxes, among other things.

Many types of bike racks are available for carrying bikes on top or behind vehicles. Bike racks that clamp the front forks of a bike ("fork mount") have the disadvantage that they require removal, and subsequent reinstallation, of the front wheel. However, fork mount racks are desirable particularly for high-end bike frames because they avoid the need to clamp the tubes of the frame, and because they hold the bike more firmly, substantially avoiding incidental vibration and movement of the bike frame in transit.

Security is always a concern for bikes held in bike racks, and is especially important for higher quality (more expensive) bikes which tend to be frequently carried by fork mount bike racks. A need exists for skewer assemblies that are inexpensive, simple to make and use, reliable, secure, and theft-resistant.

SUMMARY

A skewer assembly for securing a front fork of a bike to a fork mount includes a shaft having a bulged or enlarged portion at one end and threads at the other end. A pivoting cam lever is connected to the other end, and is capable of rotating around the shaft causing adjustment of the effective length of the shaft. The skewer assembly also includes a keyed member near the threaded end of the shaft which is prevented from rotating around the shaft. The skewer assembly may be locked by coupling the lever to the keyed member.

BRIEF DESCRIPTION OF THE DRAWINGS

FIGS. 2 and 3 are side views of a skewer assembly for use in a bike mount, more specifically, a fork mount, as shown in FIG. 1.

FIGS. 4 and 5 are partial cross-sectional views of a skewer assembly shown in FIGS. 2 and 3.

FIGS. 6 and 7 are cross-sectional views through the skewer assembly shown in FIG. 4.

FIGS. 8 and 9 are side views of an alternative skewer assembly embodiment.

FIG. 10 is a cross-sectional view through the skewer assembly shown in FIG. 8.

DETAILED DESCRIPTION

The figures and corresponding description below describe specific preferred skewer assembly configurations, and also illustrate basic concepts and principles which may be applied and implemented in numerous other variations and modifications of the invention.

Figure 1:
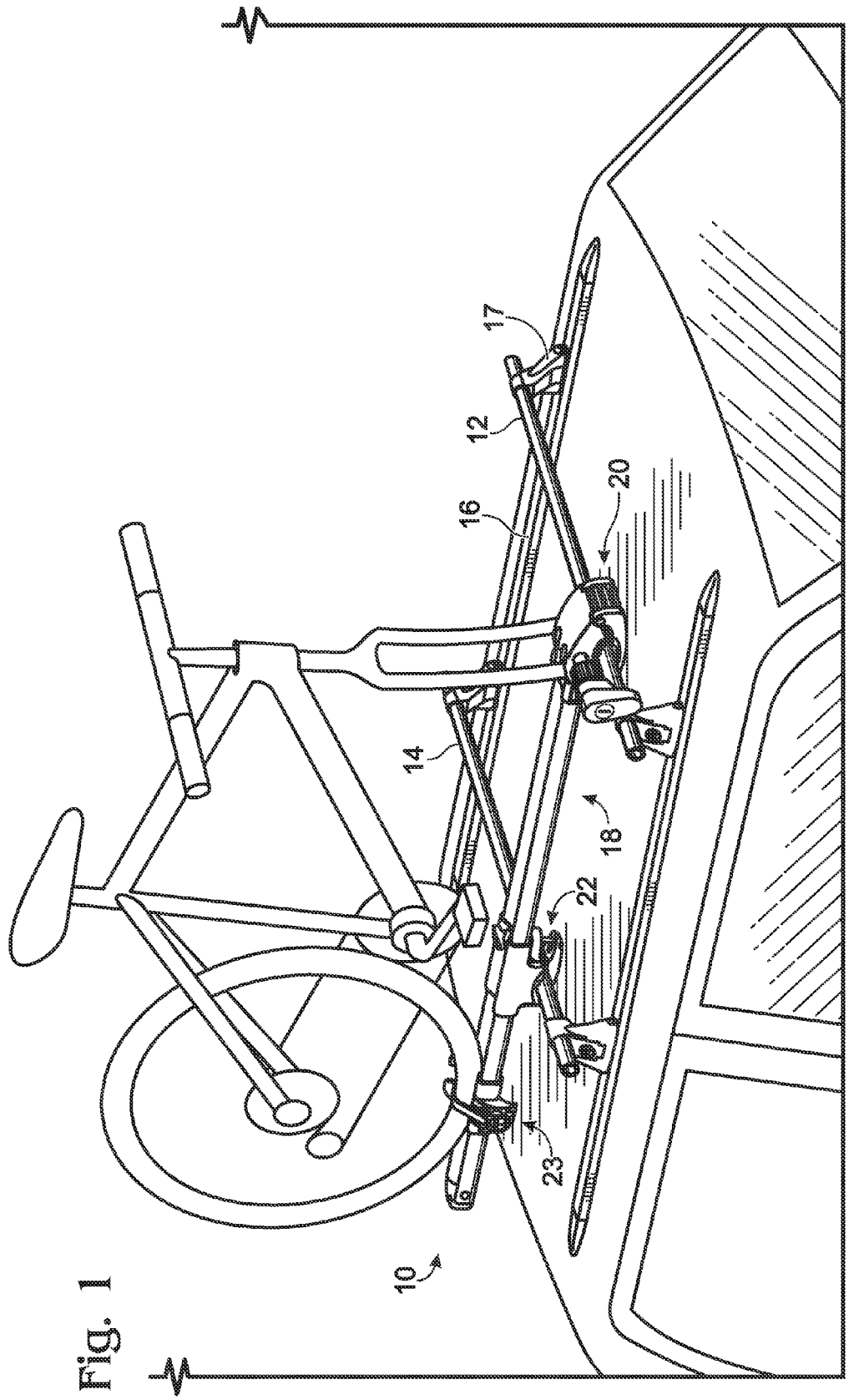
FIG. 1 is a perspective view of a bike mount for carrying a bicycle on top of a vehicle.

FIG. 1 shows bike mount 10 mounted on crossbars 12 and 14. Crossbars 12 and 14 are mounted on rails 16 via towers 17. Bike mount 10 includes wheel tray 18 which is mounted on crossbars 12 and 14 via front fork mount 20 and rear clamp 22. Rear wheel binding 23 is provided for securing the rear wheel of a bicycle. Fork mount 20 uses a skewer assembly 24 to firmly grip and secure the front fork of a bicycle. FIG. 1 shows a fork mount used to carry a bicycle on top of a vehicle. However, a fork mount using a skewer assembly, as described herein, may also be used to carry a bicycle on a hitch rack behind a vehicle, or on a trailer.

As shown in FIG. 2, skewer assembly 24 includes shaft 30 which has enlarged portion 34 at its distal end. Enlarged portion 34 is larger than a typical dropout on a bicycle fork. An enlarged end of a skewer preferably has a diameter of approximately 19 mm (0.75 inches). A typical axle on a bicycle wheel has a diameter of 9 mm. A typical dropout diameter on a bike fork is slightly larger than 9 mm. The diameter of the flat clamping area on a typical dropout is about 20 mm or larger. A typical quick release device has a nut diameter of approximately 19 mm. An exemplary skewer assembly typically has an enlarged end portion of about 19 mm (0.75 inches).

Proximal end 38 of shaft 30 is threaded. Compression sleeve 44 is keyed to prevent rotation around shaft 30. Lock plate 50 is also provided at the proximal end of shaft 30. Lock plate 50 is keyed relative to an internal bushing (not shown in FIG. 2). Interface 54 between lock plate 50 and compression sleeve 44 has corresponding teeth which prevent lock plate 50 from rotating relative to compression sleeve 44 when lock plate and compression sleeve 44 are pressed together. Cam lever 58 may be used as a handle to rotate the internal tension bushing (not shown) which is threaded around the threaded end 38 of shaft 30. Lock 62 is provided for retaining lever 58 in its tightened, and locked position, as shown in FIG. 2.

FIG. 3 shows the same skewer assembly 24 as in FIG. 2. However, in FIG. 3 cam lever 58 is in an open position which, due to cam surface 70, releases pressure of lock plate 50 on compression sleeve 44.

FIGS. 4 and 5, corresponding to FIGS. 2 and 3, show cross-sections revealing inner mechanisms of skewer assembly 24. FIG. 4 shows cam lever or handle 58 in its tightened and locked position. Shaft 30 has threads on proximal end portion 38. As shown in FIG. 6, shaft 30 is keyed to compression sleeve 44, thereby preventing compression sleeve 44 from rotating around shaft 30. However, compression sleeve 44 is capable of sliding axially along the length of shaft 30. As shown in FIG. 7, tension bushing 80 is keyed relative to locking plate 50, and is also pivotally connected to cam lever 58 at pivot point 82. Therefore, tension bushing 80 is rotationally coupled, in essence, prevented from rotating relative to locking plate 50. However, locking plate 50 may slide axially relative to tension bushing 80. Tension bushing 80 is threaded onto proximal end 38 of shaft 30. Rotation of tension bushing 80, along with locking plate and handle 58, around the axis of shaft 30, causes tension bushing 80 to move along shaft 30, either shortening or lengthening the effective length of the clamping skewer along skewer axis A.

A "keyed" relationship between two members means that the two members are structurally coupled or linked in such a way that one member may not rotate relative to the other member. A keyed relationship may be achieved by a male/female engagement through a non-cylindrical interface. For example, the interface may be partially cylindrical combined with flat surfaces around the circumference. Alternatively, a keyed relationship may be connecting two members with a pin defining a pivotal axis which is perpendicular to a rotational axis of the coupled members. In another example of a keyed relationship or linkage, one member may have a slot for receiving a projection from the other member which restricts rotational movement relative to the two members.

FIG. 5 shows the same skewer assembly 24 of FIG. 4. However, handle 58 is in the open position, meaning handle or lever 58 has rotated clockwise approximately 90 degrees around pivot axis B. A principal difference between the assembly position in FIG. 4 versus FIG. 5, is that in FIG. 4 locking plate 50 is rotationally locked and engaged relative to compression sleeve 44. In contrast, in the open position shown in FIG. 5, locking plate 50 may rotate relative to compression spring 44, thereby tightening or loosening skewer assembly 24.

Lever 58 and bushing 80 have a "threaded connection" with shaft 30. A "threaded connection" means that two members are related through complementing sets of threads which facilitate axial movement in response to rotation of one member relative to the other. A threaded connection may be direct in which case both members have complementing thread patterns which control overlapping movement of the members relative to each other. Alternatively, a threaded connection may be indirect in which case the two members are connected through an intermediate or coupling member. In this example, the intermediate member may be rotationally keyed or locked relative to one of the members and have a threaded engagement relative to the other member. Typically, in a threaded connection, one of the members has external threads while the other member has internal matching threads. In a threaded connection, threads may be continuous around the circumference of a cylindrical surface. Alternatively, threads may only be present over a portion of a cylindrical surface.

FIGS. 8 and 9 show an alternative skewer assembly example. Skewer assembly 100 includes shaft 104. Shaft 104 has an enlarged portion 108 at its distal end. The proximal end portion of shaft 104 has threads 112. Follower portion 120 is part of, or fixedly connected to locking plate portion 124. As shown in FIG. 10, follower 120 is keyed relative to shaft 104 by pin 126. Therefore, follower 120 is prevented from rotating around axis C of shaft 104, however, is permitted to slide axially along the length of shaft 104. Cam lever 130 is pivotally mounted on lock base 132. Cam lever 130 has an appropriate cam surface 133 which alters the distance between lock base 132 and locking plate 124, as cam lever 130 rotates around pivot axis D from the locked position shown in FIG. 8, to the unlocked position shown in FIG. 9. Locking projection 134 may fit in a slot (not shown) in locking plate 124 to prevent rotation of lever 130 around axis C of shaft 104. Key 140 may be used to selectively prevent or allow projection 134 to be removed from the slot (FIG. 10) of locking plate 124.

Figure 11:
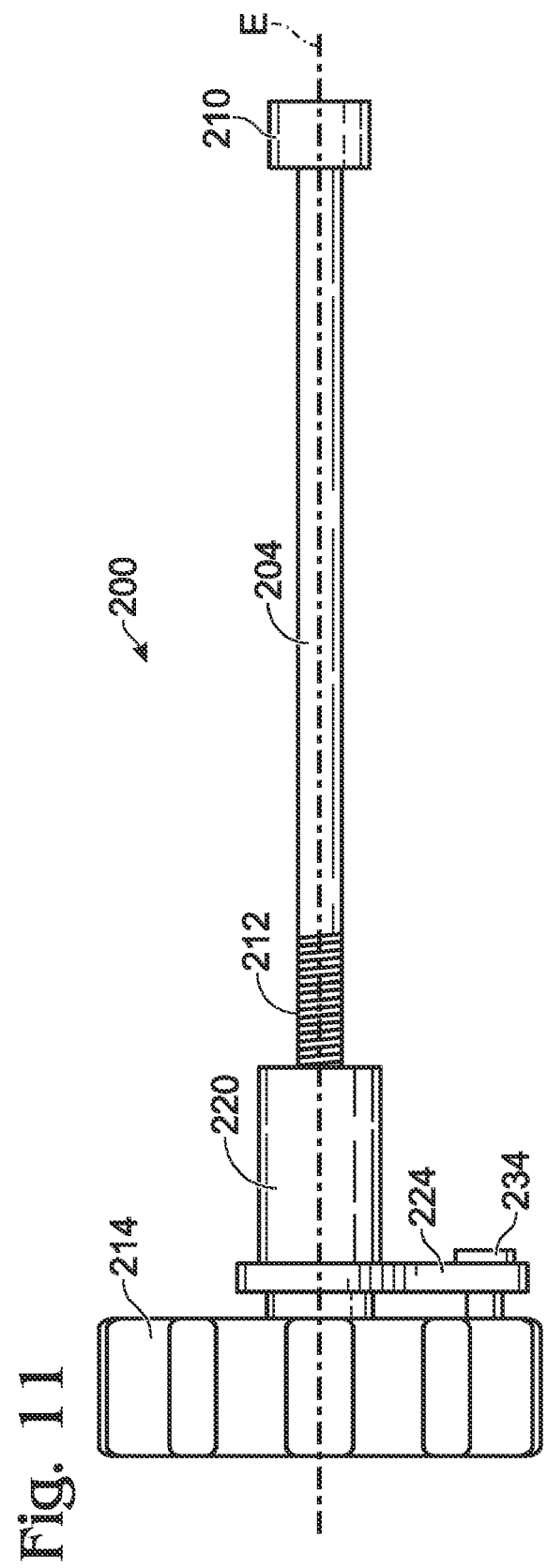
FIG. 11 is a side view of another skewer assembly embodiment.

FIG. 11 shows another variation of a skewer assembly for a bicycle fork mount. Skewer assembly 200 includes shaft 204. Shaft 204 has enlarged portion 210 at its distal end. The proximal end of shaft 204 has threads 212 for engaging internal threads (not shown) in or connected to screw handle 214. Follower 220 is fixedly connected to locking plate 224 which has a slot (not shown) for receiving lock projection 234 when handle 214 is in its locked position. Follower 220 and locking plate 224 are keyed relative to shaft 204 similarly to the example shown in FIGS. 8 and 9. Follower 220 is allowed a range of axial movement along the length of shaft 204, however, is prevented from rotating around axis E of shaft 204.

The various structural members disclosed herein may be constructed from any suitable material, or combination of materials, such as metal, plastic, nylon, plastic or any other materials with sufficient structural strength to withstand the loads incurred during use. Materials may be selected based on their durability, flexibility, weight, and/or aesthetic qualities.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, but neither require nor exclude two or more such elements. Further, ordinal indicators, such as first, second, or third for identified elements are used to distinguish between the elements; they do not indicate a required or limited number of such elements, and do not indicate a particular position or order of such elements unless otherwise specifically stated. Any aspect shown or described with reference to a particular embodiment should be interpreted to be compatible with any other embodiment, alternative, modification, or variance.

This disclosure provides examples of devices, methods, and apparatus for carrying cargo on or in connection with a vehicle. Many alternatives and modifications which may or may not be expressly mentioned, are enabled, implied, and accordingly supported by the disclosure and the following claims.

We claim:

1. A bike rack comprising
an elongate wheel tray body configured to support a bicycle,
a front clamp connected to the wheel tray body, configured to secure the wheel tray body on a first crossbar,
a rear clamp connected to the wheel tray body, configured to secure the wheel tray body on a second crossbar,
a rear wheel binding connected to the wheel tray body, configured to secure the rear wheel of a bike on the wheel tray body, and
a fork mount having a skewer assembly for securing a fork of a bike to the fork mount, the skewer assembly including, a shaft having a first end portion and a second end portion, the first end portion having an enlarged structure larger than a standard drop out gap, the second end portion having threads, a keyed member connected to the second end portion of the shaft, the keyed member being free to slide axially along the shaft but not permitted to rotate around the shaft, a handle device having a threaded connection to the second end portion of the shaft, rotation of the handle device around the shaft causing adjustment of an effective length of the shaft, and a lock device configured to selective couple the handle device to the keyed member and prevent rotation of the handle device around the shaft wherein the lock device includes a locking plate being keyed to the handle device and having an interface configured for locking engagement with the keyed member under pressure when the handle device is manipulated to a locking position.

2. A bike rack comprising
a fork mount having a skewer assembly for securing a fork of a bike to the fork mount, the skewer assembly including
a shaft having first and second end portions, the second end portion of the shaft being threaded, an enlarged member connected to the first end portion of the shaft, a compression sleeve keyed to the second end portion of the shaft so that the sleeve cannot rotate around the shaft, the compression sleeve being biased away from the first end portion of the shaft, a tension bushing engaging threads on the second end portion of the shaft, the tension bushing being at least partially contained inside the compression sleeve, a cam lever pivotally attached to the tension bushing, the cam lever being moveable between first and second positions, wherein the tension bushing is prevented from rotating around the second end portion of the shaft when the cam lever is in the first position, and is free to rotate around the second end portion of the shaft when the cam lever is in the second position, and a locking plate between the compression sleeve and the cam lever, the locking plate being keyed to the tension bushing, and having an interface configured for locking engagement with the compression sleeve under pressure when the cam lever is in the first position.

3. A bike rack comprising a fork mount having a skewer assembly for securing a fork of a bike to the fork mount, the skewer assembly including a shaft having an elongate axis, a first end portion, and a second end portion, the first end portion having an enlarged structure larger than a standard drop out gap, the second end portion having threads, a keyed member connected to the second end portion of the shaft, the keyed member being free to slide axially along the shaft but not permitted to rotate around the shaft, a handle device having a threaded connection to the second end portion of the shaft, rotation of the handle around the shaft causing adjustment of an effective length of the shaft, a lock device configured to couple the handle device to the keyed member and prevent rotation of the handle around the shaft, and wherein the handle device includes a locking plate having a locked position and an unlocked position, the locking plate being rotatable around the elongate axis of the shaft when the locking plate is in the unlocked position, the locking plate being coupled to the keyed member and unable to rotate around the elongate axis of the shaft when the locking plate is in the locked position.

4. The bike rack of claim 3, wherein the locking plate and the compression sleeve have a complimenting grooved interface.

5. The bike rack of claim 3, wherein the second end portion of the shaft and the keyed member have a circumferential non-circular interface restricting rotation of the keyed member around the shaft.

6. The bike rack of claim 3, wherein the second end portion of the shaft and the keyed member have a slotted interface restricting rotation of the keyed member around the shaft.

7. The bike rack of claim 3, wherein the handle device includes a cam lever pivotally mounted on an axis perpendicular to the elongate axis of the shaft.

8. The bike rack of claim 7, wherein a portion of the lock device is carried on the cam lever and configured to selectively restrict rotational movement of the handle around the elongate axis of the shaft.

9. The bike rack of claim 3 wherein the keyed member includes a compression sleeve mounted on the second end portion of the shaft, the compression sleeve being keyed relative to the shaft so that it cannot rotate around the elongate axis of the shaft, but is permitted to slide axially along the shaft.

10. The bike rack of claim 9, wherein the handle device includes a bushing having threads engaging the threads on the second end portion of the shaft, and being variably received inside the compression sleeve.

11. The bike rack of claim 10, wherein the compression sleeve contains a spring urging the bushing and the compression sleeve together.

12. The bike rack of claim 3, wherein the handle device includes a bushing having threads engaging the threads on the second end portion of the shaft.

13. The bike rack of claim 12, wherein the threads on the shaft are external and the threads on the bushing are internal.

14. The bike rack of claim 12, wherein the threads on the shaft are internal and threads on the bushing are external.

15. The bike rack of claim 12, wherein the handle device includes a cam lever pivotally mounted on the bushing.

16. The bike rack of claim 3 further comprising a wheel tray body for supporting a bike, and a rear wheel binding for securing the rear wheel of a bike.

17. The bike rack of claim 16 further comprising a hitch-compatible mounting assembly for securing the bike rack behind a vehicle.

18. The bike rack of claim 16 further comprising a front clamp device for securing the wheel tray body to a front crossbar on top of a vehicle or on a trailer.

19. The bike rack of claim 18 further comprising a rear clamp device for securing the wheel tray body to a rear crossbar on top of a vehicle or on a trailer.

* * * * *